United States Patent [19]
Turner et al.

[11] Patent Number: 5,956,703
[45] Date of Patent: Sep. 21, 1999

[54] CONFIGURABLE NEURAL NETWORK INTEGRATED CIRCUIT

[75] Inventors: Douglas D. Turner, Kokomo, Ind.; Gabriela Breuer, Santa Barbara, Calif.

[73] Assignee: Delco Electronics Corporation, Kokomo, Ind.

[21] Appl. No.: 08/508,637

[22] Filed: Jul. 28, 1995

[51] Int. Cl.$^6$ .................................................. G06F 15/18
[52] U.S. Cl. .............................................. 706/27; 395/24
[58] Field of Search .................... 395/27, 22, 24, 395/11; 382/197

[56] References Cited

U.S. PATENT DOCUMENTS

| | | | |
|---|---|---|---|
| 5,073,867 | 12/1991 | Murphy et al. | 395/27 |
| 5,142,666 | 8/1992 | Yoshizawa et al. | 395/24 |
| 5,165,010 | 11/1992 | Masuda et al. | 395/27 |
| 5,170,463 | 12/1992 | Fujimoto et al. | 395/11 |
| 5,216,751 | 6/1993 | Gardner et al. | 395/27 |
| 5,278,945 | 1/1994 | Basehore et al. | 395/27 |
| 5,303,311 | 4/1994 | Epting et al. | 382/197 |
| 5,339,242 | 8/1994 | Reid et al. | 701/45 |
| 5,384,896 | 1/1995 | Sakaue et al. | 395/24 |
| 5,524,175 | 6/1996 | Sato et al. | 395/11 |

OTHER PUBLICATIONS

Chang et al., Design of multiprocessor DSP chip for flexible information processing, ICASSP–92, pp. 637–640, Mar. 26, 1992.

Chang et al., Digital VLSI multi–processor design for neuro–computers, IJCNN–92, pp. 1–6, Jun. 11, 1992.

Aihara et al., A sparse memory–access neural network engine with 96 parallel data–driven processing units., IEEE–95, pp. 72–73, Feb. 17, 1995.

A VLSI Solution to On–chip Learning Neural Networks, Adaptive Solutions, Inc., Beaverton OR.

Association Engine User's Manual, Dec. 1993, Motorola.

Electrically Trainable Analog Neural Network, 80170NX, Intel Corporation, 1991, pp. 2–15.

High–Density Complementary Metal Oxide Semiconductor (HCMOS) Microcontroller Unit, HC11, MC68HC11F1, Technical Data, (Rev.2)Motorola, Inc., 1990.

*Primary Examiner*—Allen R. MacDonald
*Assistant Examiner*—Sanjiv Shah
*Attorney, Agent, or Firm*—Michael J. Bridges

[57] ABSTRACT

A neural network IC 31 includes n dedicated processing elements (PEs) 62, an output register 66 for storing the PEs' outputs so that they are immediately accessible to all of the PEs, a number of output circuits 78 that are connected to selected PEs to provide binary outputs, and a timing circuit 74. Each of the PEs includes a weight memory 90 for storing input, output and bias weight arrays, a first in first out (FIFO) memory 88 for storing input data, a dot product circuit 92 and an activation circuit 94. The dot product circuit computes a dot product of the input weight array and the contents of the FIFO memory, a dot product of the output weight array and the contents of the output register, a dot product of the bias value and a constant, and sums the three results. The activation circuit maps the output of the dot product circuit through an activation function to produce the PE's output. The inclusion of a memory 90 that stores both input and output weight arrays in conjunction with the output register 66 allows the PEs to be configured to implement arbitrary feed-forward and recurrent neural network architectures.

5 Claims, 7 Drawing Sheets

CONFIGURABLE NEURAL NETWORK INTEGRATED CIRCUIT

BACKGROUND OF THE INVENTION

1. Field of the Invention

The present invention generally relates to neural network integrated circuits (ICs), and more specifically to a neural network IC having dedicated processing elements (PEs) that can be configured to provide a desired feed-forward or recurrent neural network architecture.

2. Description of the Related Art

A neural network includes a number of PEs that are interconnected in a multilayer architecture to detect data patterns. Neural networks are used for encoding data, sensor data decoding, target recognition, image compression, handwriting and speech recognition, and signal prediction. As shown in FIG. 1, a neural network 10 includes PEs 11 that are configured to form an input layer 12 that distributes input data $X_i$, one or more hidden layers 14 that extract features $F_i$ from input data $X_i$, and an output layer 16 that weights each of the individual features $F_i$ and combines them to produce a number of network outputs $O_i$. The number of hidden layers and the number of PEs allocated to each layer generally increases with the number and complexity of the extracted features.

The outputs of PEs 11 in one layer are transmitted to PEs in the next layer through links 18, which amplify or attenuate the PE outputs by multiplying them by an array of weights $W_{ij}$. The weights for each PE are established by training the neural network to produce either predetermined outputs in response to known input data or outputs that differentiate between classes that occur naturally in the data. Except for the input layer PEs, which are used only to distribute the input data, the net input to each PE is the sum of the weighted outputs of the PEs in the previous layer. Each PE is activated in accordance with its net input and an activation function, designated generally as f(.), to generate the PE's output. In the input layer, the activation function simply passes the data. In the hidden and output layers, the activation function is a non-decreasing differentiable function, typically sigmoidal in shape.

Currently, neural networks are implemented with two types of ICs. One approach uses multiple general purpose processors that are fabricated on a single IC. This approach is very flexible, but is slow because of the software that is required to simulate the neural network computation. A second approach is a dedicated neural network chip, which is very fast but has limited architectural flexibility.

An example of the first approach is the Adaptive Solutions, Inc. Connected Network of Adaptive Processors (CNAPS) IC. This is a general purpose IC that includes 64 independent general purpose processing units that perform parallel/vector operations. The CNAPS IC can simulate a wide variety of multilayer architectures and is not limited to computing neural networks. However, when the IC is used to compute neural networks, it is slow because an external microprocessor is required to configure the processing units to simulate PEs and to issue instruction commands to compute the neural network. The CNAPS IC reads in and processes vectors of data, and hence does not handle sequential waveform data efficiently. Furthermore, the processing units (PEs) are only connected to their nearest neighbors in the architecture so that their outputs are not available to all of the PEs at the next computation cycle. Motorola, Inc.'s Association Engine (AE) is a similar IC that includes 64 independent vector processing units and a single instruction processor, and has the same limitations as the CNAPS IC.

An example of the second approach is Intel Corporation's Electrically Trainable Analog Neural Network (ETANN) IC 80170NX, which is a dedicated neural network processing chip that includes two layers of dedicated analog PEs, with 64 PEs in each layer. Analog inputs are applied in parallel to the IC through a single sample-and-hold circuit. The dedicated chip is much faster than the microprocessor based CNAPS IC because it automatically processes the vector of input data in accordance with the PEs' weights and activation functions to generate an output vector. However, a single ETANN chip is limited to a two-layer neural network with a maximum of 64 inputs and 64 outputs. A particular architecture is selected by zeroing the weights for certain PEs, and a second ETANN IC must be added to implement larger networks. Although the ETANN chip is fast, it is inflexible and wastes unused PEs. Furthermore, the PEs' outputs are only accessible to PEs in the subsequent layer, which limits the computational flexibility of the network.

SUMMARY OF THE INVENTION

In view of the above problems, the present invention provides a neural network IC that exhibits the flexibility of a microprocessor-based IC, the speed of a dedicated neural network IC, processes both vector and sequential data efficiently, and makes the PEs' outputs during one computation cycle immediately accessible to all PEs at the next computation cycle.

This is accomplished with a neural network IC that includes n dedicated processing elements (PEs), an output register for storing each of the PEs' outputs so that they are immediately accessible to all of the PEs, a number of output circuits that are connected to selected PEs to provide binary outputs, and a timing circuit. The IC is designed to act as a slave to a general purpose microprocessor that provides initialization information, writes input data to the PEs, reads output data from the output register, and provides timing control.

Each of the PEs includes a weight memory for storing input, output, and bias weight arrays, a first in first out (FIFO) memory for storing input data, a dot product circuit and an activation circuit. The dot product circuit computes a dot product of the input weight array and the contents of the FIFO memory, a dot product of the output weight array and the contents of the output register, a dot product of the bias value and a constant, preferably 1, and sums the three results. The activation circuit maps the output of the dot product circuit through an activation function to produce the PE's output.

The inclusion of a memory that stores both input, output and bias weight arrays in conjunction with the output register allows the PEs to be configured to implement many different neural network architectures. A particular architecture is implemented by selectively zeroing out some of the PEs' input and output weights, thereby defining the relative positions of the PEs and the connections between them. The weights can be stored in ROM on the chip or can be read in from the external processor and stored in RAM.

For a better understanding of the invention, and to show how the same may be carried into effect, reference will now be made, by way of example, to the accompanying drawings.

DETAILED DESCRIPTION OF THE INVENTION

The present invention provides a neural network IC that is designed to act as a slave to a master general purpose processor. The IC is described in the context of a supplemental inflatable restraint (SIR) system, but is generally applicable to applications such as image compression, target recognition, speech and handwriting recognition, and signal prediction. The IC includes a number of dedicated PEs that have memories for storing weights for both input data and prior PE outputs, and also includes an output register for storing the output of each PE. The PEs are configured to implement a particular feed-forward or recurrent architecture by programming the contents of their weight memories. The master processor controls the transfer of data to and from the neural network IC, but does not issue any instructions to the PEs related to the computation of the neural network. The PEs are dedicated circuits that execute automatically. Thus, the IC combines the flexibility of microprocessor-based ICs and the speed of dedicated neural network ICs. Furthermore, each PE preferably includes a first in first out (FIFO) memory for storing input data, which allows the IC to process both sequential waveform data and vector data efficiently.

In a dedicated application, such as an SIR system for a particular vehicle, the configuration data for a single neural network architecture is preferably stored in ROM on the ICs to increase its speed. Another option is to store configuration data for a number of different architectures in the ROM, such as the SIR configuration data for different types of cars. The neural network IC may also be used in systems where the detection problem may change or where the final configuration data is unknown. In these systems, a user can program the master processor with the desired configuration data, which in turn conveys the data to the IC. Alternately, a training algorithm, such as the well known backpropagation algorithm, can be used to establish the configuration data.

Figure 2:
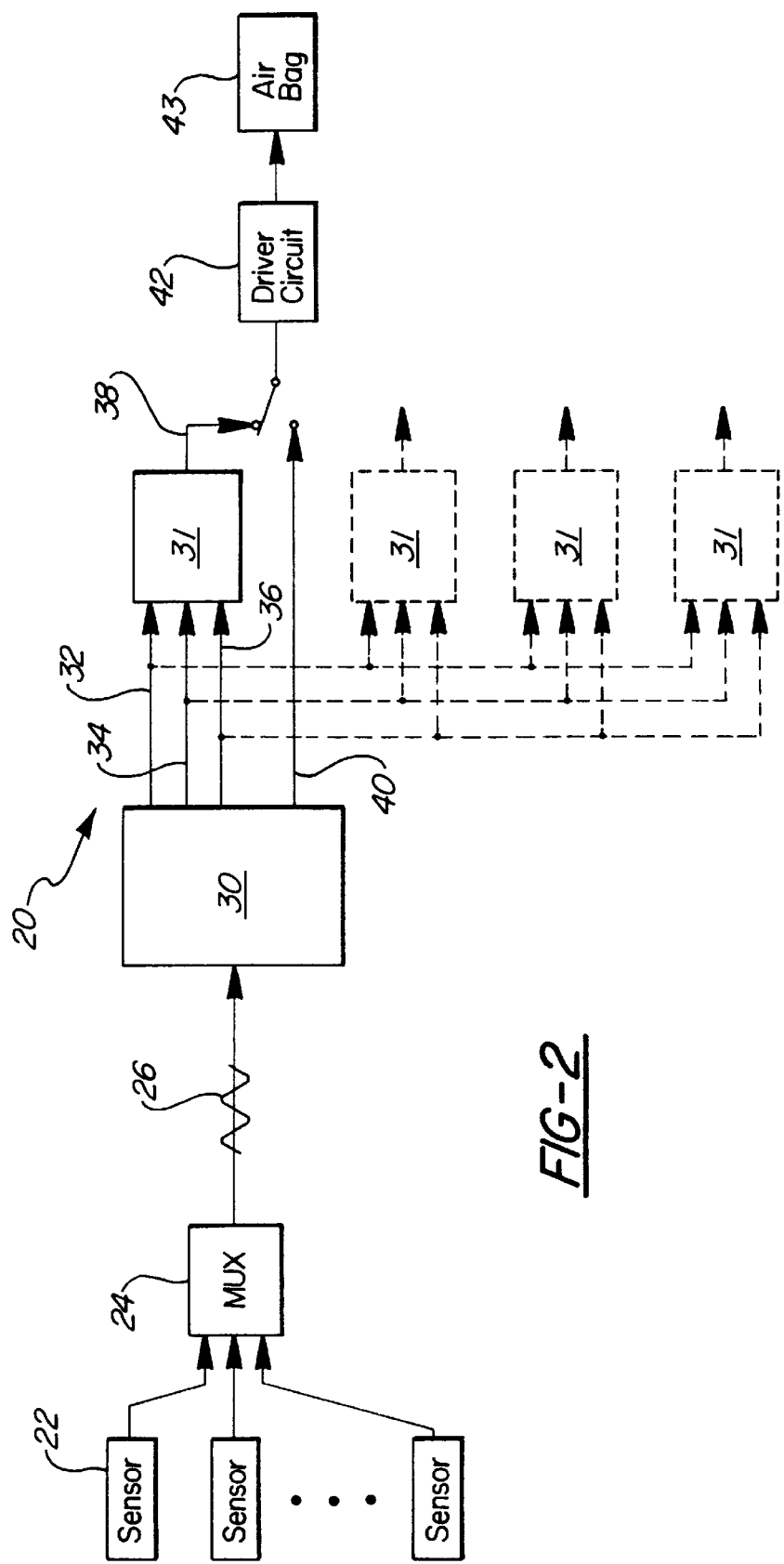
FIG. 2 is a block diagram of a detection system that includes a master processor and a slave neural network IC in accordance with the present invention.

As shown in FIG. 2, an SIR system 20 senses acceleration data from a number of locations around a vehicle (not shown), determines whether an impact has occurred and decides what action to take, such as inflating the driver, passenger, and/or side-mounted air bags at a rate appropriate for the magnitude of the impact and/or increasing the tensions on the seatbelts. The SIR system 20 includes a plurality of acceleration sensors 22 that are positioned at different locations on the vehicle to measure its forward and side-to-side accelerations. Each sensor 22 produces acceleration values at intervals of preferably at least 2.0 ms. A multiplexer 24 multiplexes the values to form a data sequence 26 and writes the sequence to the master processor 30.

A master processor IC 30, such as the Motorola M68-HC11F1 single chip microcomputer, is used to write data sequence 26 to a number of neural network ICs 31 that are configured to implement a desired neural network architecture. Data is transferred between the master processor 30 and neural network ICs 31 over a data bus 32, preferably an 8 bit bus, an address bus 34, preferably a 13 bit bus, and a read/write control bus 36, preferably a 1 bit bus. The neural network ICs 31 generate internal output values $O_j$, which are transferred to the master processor 30 and produce binary outputs 38 which identify known patterns in data sequence 26.

The master processor 30 includes a memory map for each of the ICs 31, memory for storing initialization, and configuration data, if applicable, and is programmed to sequentially transfer data sequence 26 to ICs 31 to execute the neural network. At start up, the master processor 30 reads the initialization and configuration data from memory, enables the neural network ICs 31, places the data on data bus 32, places an appropriate address from the memory map on address bus 34, and switches read/write control line 36 to its write state. The ICs 31 read the data off data bus 32 and configure themselves to implement the desired neural network.

When master processor 30 receives its first piece of acceleration data, it selects a particular IC 31, places the data and the appropriate memory address on data and address buses 32 and 34, respectively, and sets read/write control line 36 to its write state. Once IC 31 has read in the data, master processor 30 transmits a start cycle command to IC 31 to start the neural network computations. When IC 31 completes a computation cycle, it returns an interrupt command to the master processor, which in turn sends an output enable command back to the IC 31. This enables the neural network IC 31 to generate binary outputs 38.

To provide an alternate output and to evaluate the performance of the neural network, master processor 30 reads the ICs' internal output values $O_j$. The master processor 30 places an appropriate address for IC 31 on address bus 34 and drives read/write bus 36 to its read state. The IC 31 responds by placing the requested output value on data bus 32, where it is read by master processor 30. The master processor can transmit those values to a user for evaluation and/or can process them to provide the alternate output.

The neural network can be used as a backup or fail safe system to augment a conventional detection system such as the one described in U.S. Pat. No. 5,339,242, which computes energy and oscillation measures from the acceleration data and compares them to boundary curves. If the computed values exceed the boundaries, the system inflates the air bags. Master processor 30 is preferably programmed to implement the conventional algorithm. When the neural network and conventional system are in agreement, the master processor 30 generates binary outputs 40 (which are the same as binary outputs 38 from the ICs 31). If they disagree, the master processor generates binary outputs 40 that inhibit air bag inflation.

A driver circuit 42 is wired to either the neural network ICs 31 to receive binary outputs 38, or the master processor 30 to receive binary outputs 40. The driver circuit 42 responds to the selected binary outputs by controlling the seatbelt tension and selecting which air bags are inflated and how fast. For example, the 8-bit binary outputs could allocate two bits to control seatbelt tension, and two bits each to control the driver, passenger and side-mounted air bags 43. When the bits are low, the driver circuit is inhibited.

When the first bit in a pair goes high, the driver circuit increases the tension to an intermediate level or inflates the associated air bag at a relatively slow rate. If the second bit in a pair goes high, the driver circuit increases the tension to a high level or inflates the associated air bag at a faster rate.

Under normal circumstances the acceleration values will be relatively small, reflecting normal driving and braking of the vehicle, and the data sequence 26 will reflect a pattern that the neural network recognizes as normal. When the brakes are applied severely, the acceleration values from the sensor(s) that measure forward acceleration will increase. This produces a pattern in the data sequence 26 that the SIR system recognizes as a braking pattern, causing the system to increase the tension on the lap belts. During a front or rear impact, the forward acceleration values will change dramatically, producing a distinctive impact pattern in data sequence 26. The SIR system detects the impact pattern and inflates the driver and/or passenger air bags. Similarly, a side impact causes the side-to-side acceleration values to change dramatically, producing another distinctive pattern in the data sequence 26. The SIR system detects the pattern and inflates the side-mounted air bags. The acceleration values will reflect the magnitude of the impact, causing the SIR system to inflate the air bags faster for large impacts and more slowly for smaller impacts.

Figure 3:
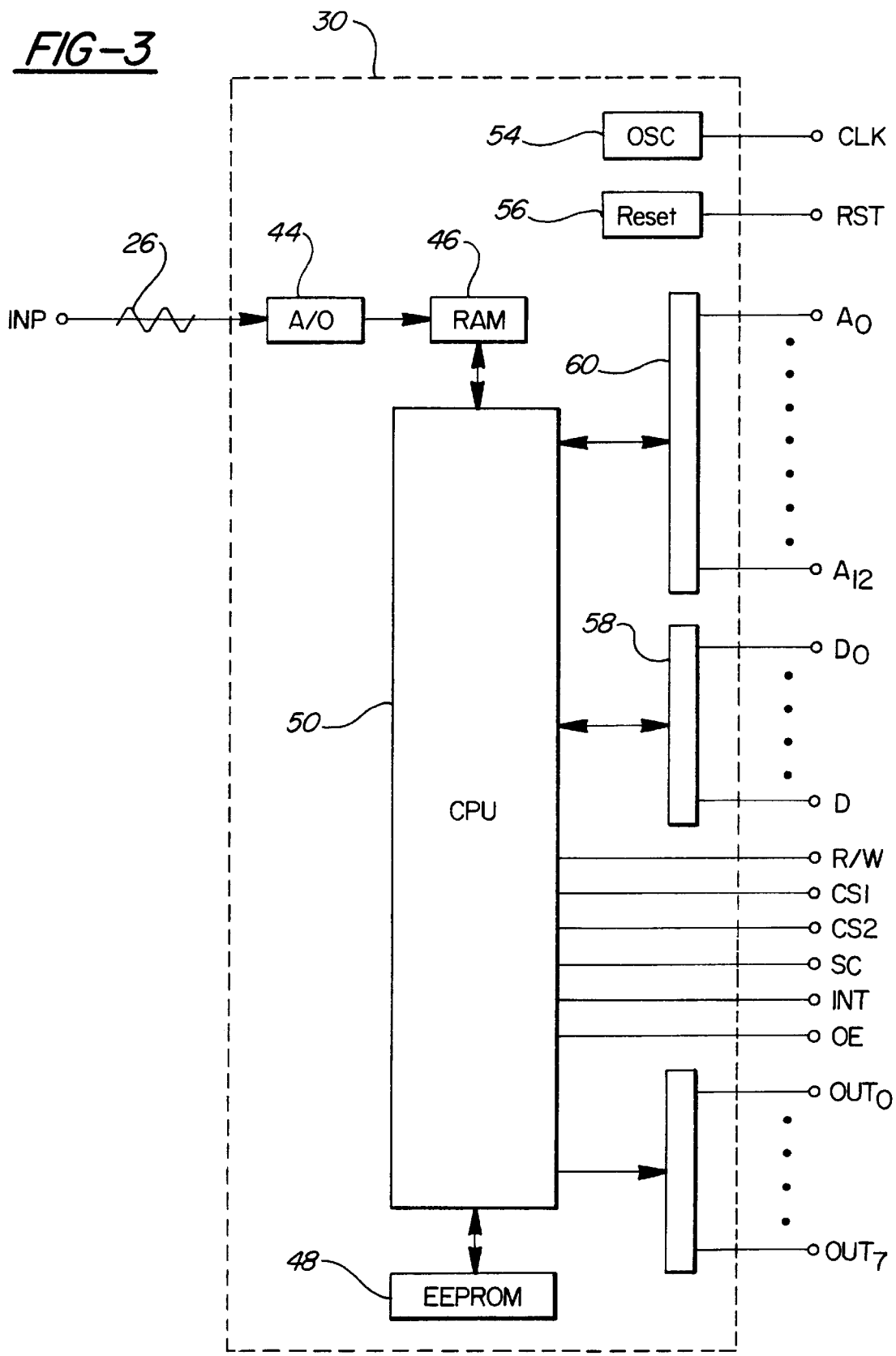
FIG. 3 is a schematic diagram of the master processor shown in FIG. 2.

As shown in FIG. 3, the master processor 30 includes an A/D converter 44 that digitizes data sequence 26 into preferably 8-bit signed values, and writes them into RAM 46. Data sequence 26 is applied to the master processor at pin INP. The initialization data for the ICs and, if applicable, the configuration data for the neural network are preferably stored in an EEPROM 48. A CPU 50 has an addressable range, also known as a memory map, which covers all applicable system components including neural network ICs 31. CPU 50 is programmed to transfer data to and from the ICs in accordance with the memory map. A local oscillator 54 generates a clock signal, suitably 16.7 Mhz, that oscillates the state of a clock line at pin CLK. A reset circuit 56 monitors the power levels, and generates a reset signal that toggles the state of a reset line at pin RST when it decides that a power failure is imminent. The pins on the master processor are connected to similarly named pins on the neural network IC as shown in FIGS. 4 and 5.

To read/write a particular IC, the CPU 50 sets the state, i.e. 0/1 voltage levels, of the chip select lines (preferably two lines for each IC) to enable that IC and disable the other three ICs. Only two of the chip select lines are shown at pins CS1, CS2. CPU 50 places the 8-bit data and appropriate 13-bit memory addresses on internal data and address buses 58 and 60, respectively, and switches read/write control line 36 at pin R/W to its write state. The internal data and address buses 58 and 60 are connected through pins $D_0$–$D_7$ and $A_0$–$A_{12}$, respectively, to respective data and address buses 32 and 34.

Once the data has been transferred to the neural network IC, the CPU 50 toggles the state of a start cycle line at pin SC to start the neural network computations. When the IC completes a computation cycle, it toggles the master processor's interrupt line at pin INT, which in turn toggles the state of an output enable line at pin OE. Toggling the output enable line enables the neural network IC to generate the binary outputs 38. The CPU 50 also generates the alternate binary outputs 40 on output lines at pins $OUT_0$–$OUT_7$.

Figure 4:
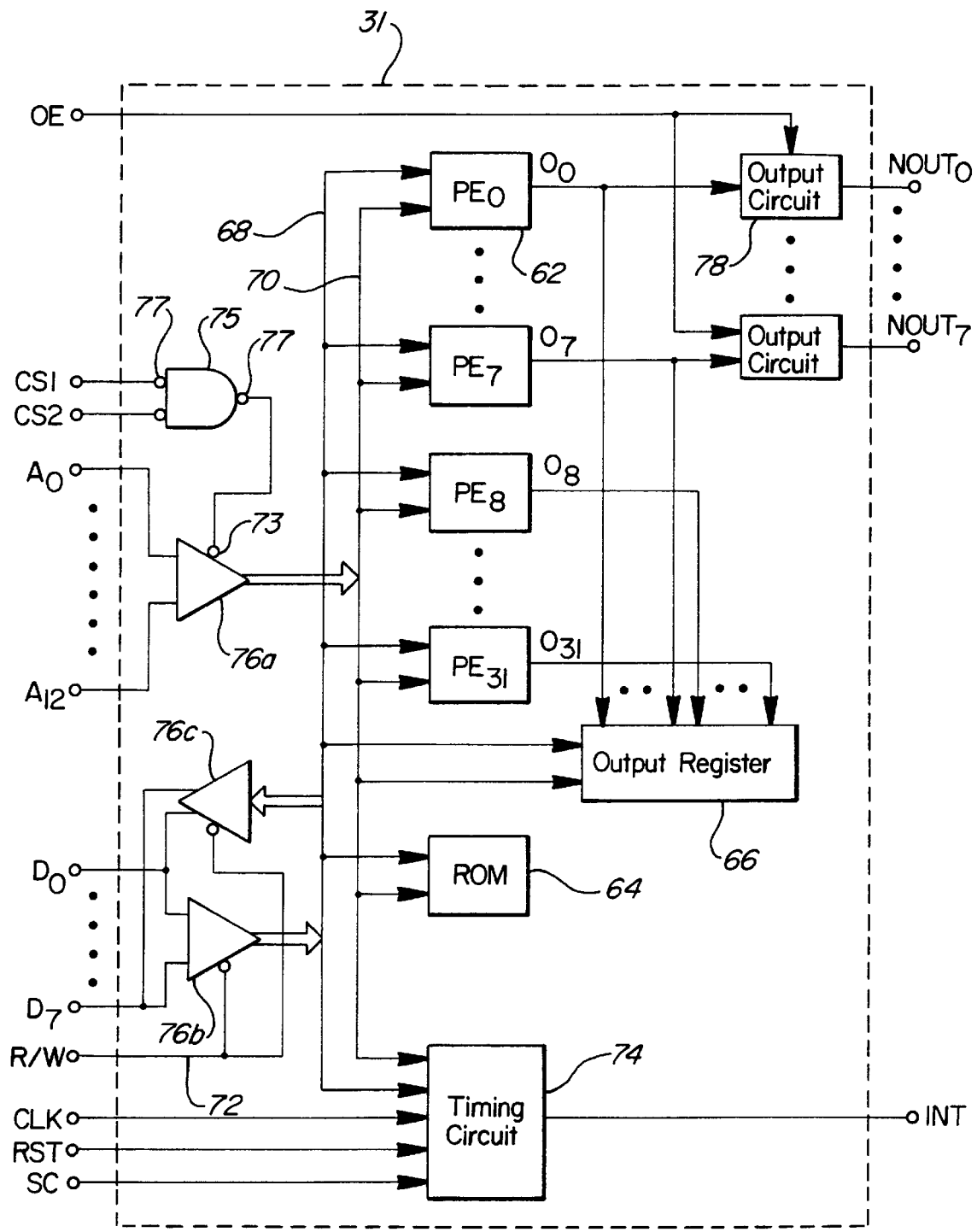
FIG. 4 is a schematic diagram of the neural network IC of FIG. 2 implemented in a dedicated feed-forward architecture.
Figure 5:
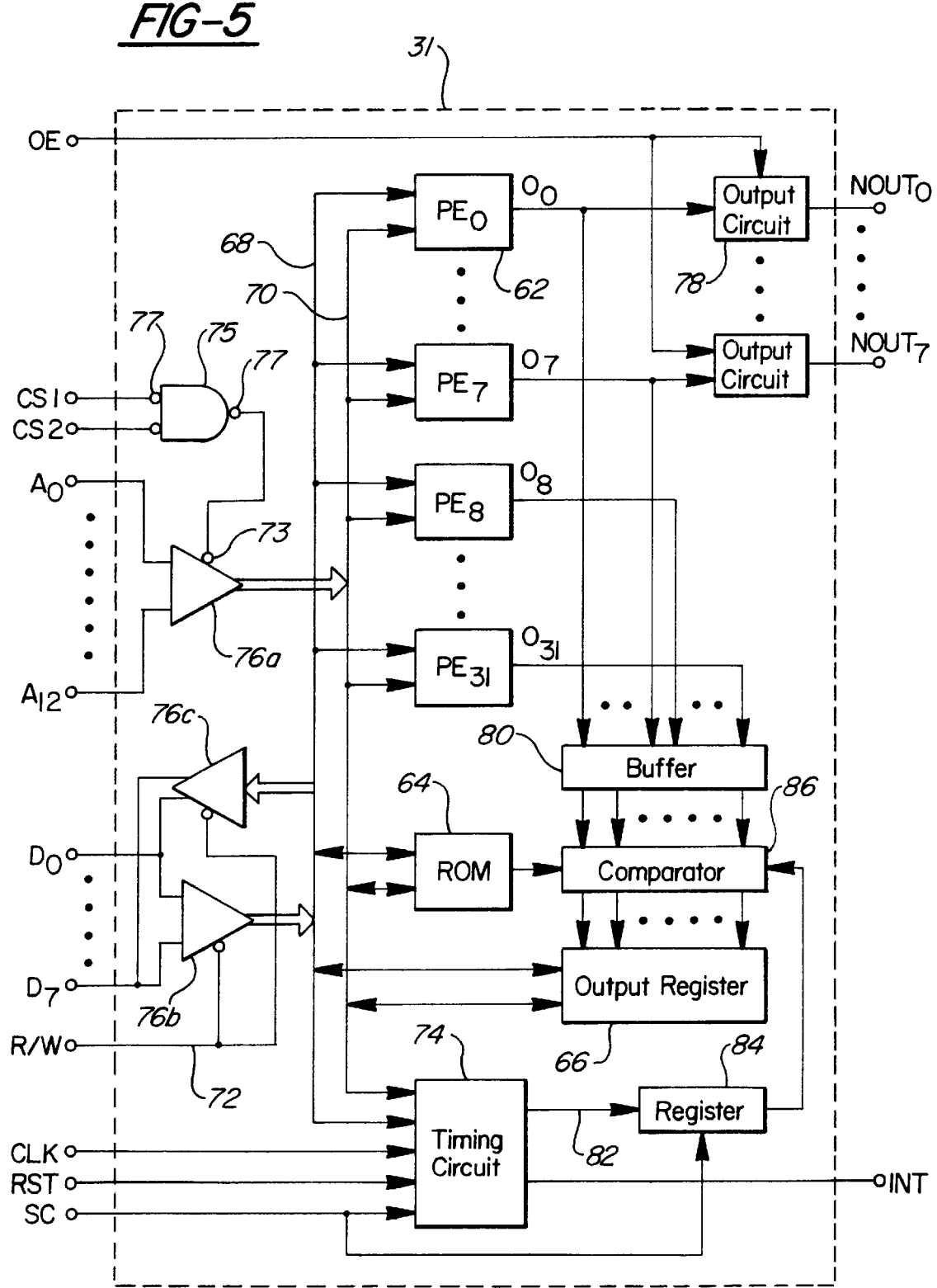
FIG. 5 is a schematic diagram of an alternate embodiment of the neural network IC of FIG. 2 that supports feed-forward and recurrent architectures.

The neural network IC illustrated in FIG. 4 is designed to implement a dedicated feed-forward architecture, and preferably has at least 39 pins: 13 address ($A_0$–$A_{12}$), 8 data ($D_0$–$D_7$), 1 read/write (R/W), 2 chip select (CS1 and CS2), 1 output enable (OE), 1 clock (CLK), 1 reset (RST), 1 cycle start (SC) and 1 interrupt (INT) that are connected to corresponding pins on the master processor IC 30 shown in FIG. 3, high ($V_{DD}$) and low (GND) supply voltage pins, and 8 output pins ($NOUT_0$–$NOUT_7$). Neural network IC 31 includes a number of dedicated PEs 62, preferably at least 32, that generate outputs $O_j$ which are a function of the input data $X_{ij}$ that is transferred from the master processor 30, weight arrays $WI_{ij}$, $WO_{ij}$ and $WB_j$ that are stored in a ROM 64, and outputs $O_j$ from the previous computation cycle that are stored in an output register 66, typically in RAM. The subscript j indicates the PE and the subscript i indicates the particular input to that PE.

Figure 1:
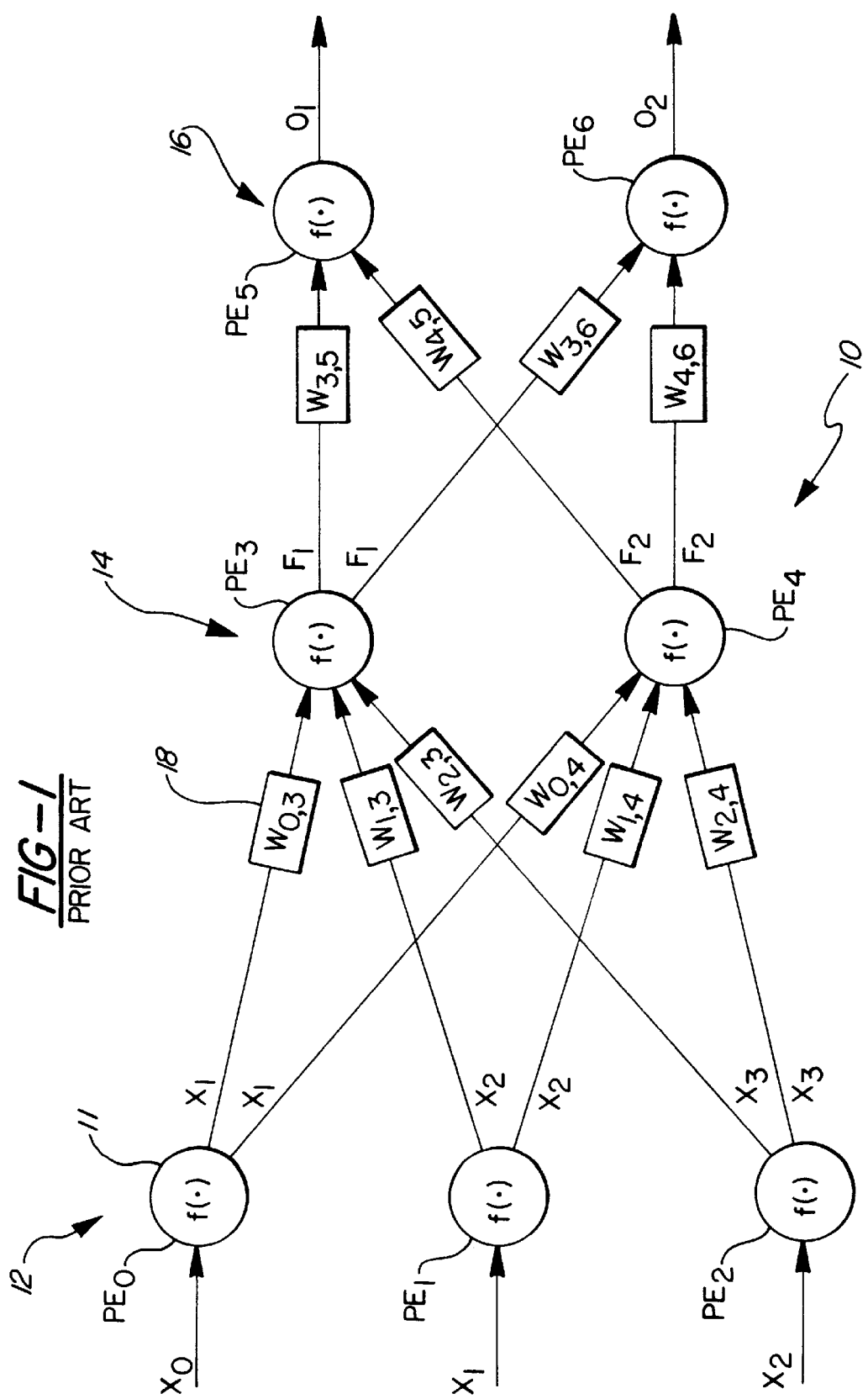
FIG. 1, described above, is a schematic diagram of a known neural network that utilizes a feed-forward architecture.

The use of output register 66 makes the previous outputs $O_j$ accessible to all PEs 62 at the next computation cycle. This allows weight arrays $WI_{ij}$, $WO_{ij}$ and $WB_j$ to be selected to configure PEs 62 in an arbitrary multilayer feed-forward architecture of the type shown in FIG. 1. The weight arrays determine the number of PE layers n, the number of PEs per layer and the weighted connections between the PEs.

Weights $WI_{ij}$, $WO_{ij}$ and $WB_j$, outputs $O_j$ and input data $X_{ij}$ are communicated to/from PEs 62 over internal address and data buses 68 and 70, using read/write line 72, an output register 66 and a timing circuit 74, and connected externally through pins $A_0$–$A_{12}$, $D_0$–$D_7$ and R/W to master processor 30. Address buffer 76a and data buffers 76b and 76c are connected between external buses 32, 34 and internal buses 70, 68. Buffers 76a and 76b have inverters 73 at their respective inputs so that they are enabled by a signal in its low state. A two input AND gate 75 having inverters 77 at both of its inputs and its output is connected between pins CS1 and CS2 and address buffer 76a. AND gate 75 produces a low signal that enables address buffer 76a when both inputs are low.

When the master processor 30 selects an IC 31, it sets the state of the ICs' chip select lines at pins CS1 and CS2 to a low state to enable address buffer 76a, thereby allowing data to be transferred to/from the external buses from/to the IC's internal buses. Master processor 30 sets the state of the ICs' read/write line at pin R/W to enable the data buffers 76b and 76c to transfer data to/from IC 31. A low state enables buffer 76b to write data to the IC and a high state enables buffer 76b to read data from the IC.

The timing circuit 74 receives as inputs the signals applied to the CLK, RST and SC pins, and the number of layers n, which is stored in ROM 64. In an n layer network, each successive layer of PEs must be computed before the next layer of PEs. Thus, a single computation cycle requires n subcycles, one for each layer. When the master processor toggles the start cycle input, the timing circuit initiates the computation of the neural network, counts a fixed number of clock cycles per subcycle, and activates the end of cycle interrupt at INT.

A selected number of PEs 62 drive output circuits 78, which compare outputs $O_0$–$O_7$ to a threshold value. Typically, the selected PEs are positioned in the network's output layer. At the completion of the computation cycle, the master processor 30 responds to the interrupt by toggling the signal applied to output enable pin OE, thereby causing the output circuits to generate binary outputs 38 at pins $NOUT_0$–$NOUT_7$.

To implement a recurrent architecture, the neural network IC must be modified, as shown in FIG. 5, so that each PE output $O_j$ is only written to the output register 66 after the one subcycle that corresponds to the PE's position, i.e. layer, in the network. In general, all PEs 62 are computed at each subcycle, but only those PEs that lie in the layer associated with that subcycle generate correct output values. Because the master processor 30 only enables the IC to generate the binary outputs 38 after the computation cycle has been completed, inaccurate output values do not effect a feed-forward architecture. However, in a recurrent architecture feeding an incorrect value back to a PE in an earlier layer would effect the neural network computation. The PE in the earlier layer would mistakenly use the value computed at the previous subcycle instead of the correct value from the previous complete cycle.

To expand the IC's capability to implement recurrent as well as feed-forward networks, the particular execution subcycle for each of the PEs is preferably stored in ROM 64 and the PEs' output values $O_j$ are first written into a temporary buffer 80. The timing circuit 74 toggles an end of subcycle line 82 at the completion of each subcycle to increment a counter in a register 84. The start cycle signal is also applied to register 84 to reset the counter to zero at the beginning of each computation cycle. A comparator 86 compares the count in register 84 to each of the execution subcycles in ROM 64, and enables the buffer 80 to write only those output values $O_j$ whose execution subcycle is the same as the count into output register 66. Consequently, the PE's incorrect output values are never written to output register 66, and thus will not corrupt the neural network computation in a recurrent architecture.

Alternately, the comparator 86 could be positioned at the input to PEs 62 and used to enable only those PEs whose execution subcycles are the same as the current subcycle. In this configuration, each PE 62 would be executed only once during a computation cycle so that only the correct output values would be written into output register 66.

To modify the ICs shown in FIGS. 4 and 5 to implement a programmable neural network, the ROM 64 is removed from the chip and replaced with temporary registers, typically RAM, in each PE 62. The temporary registers store the weights as they are read in from the master processor 30. In the recurrent IC, a configuration register for storing the number of layers n and the particular execution subcycle for each PE 62 is added to the chip.

Figure 6:
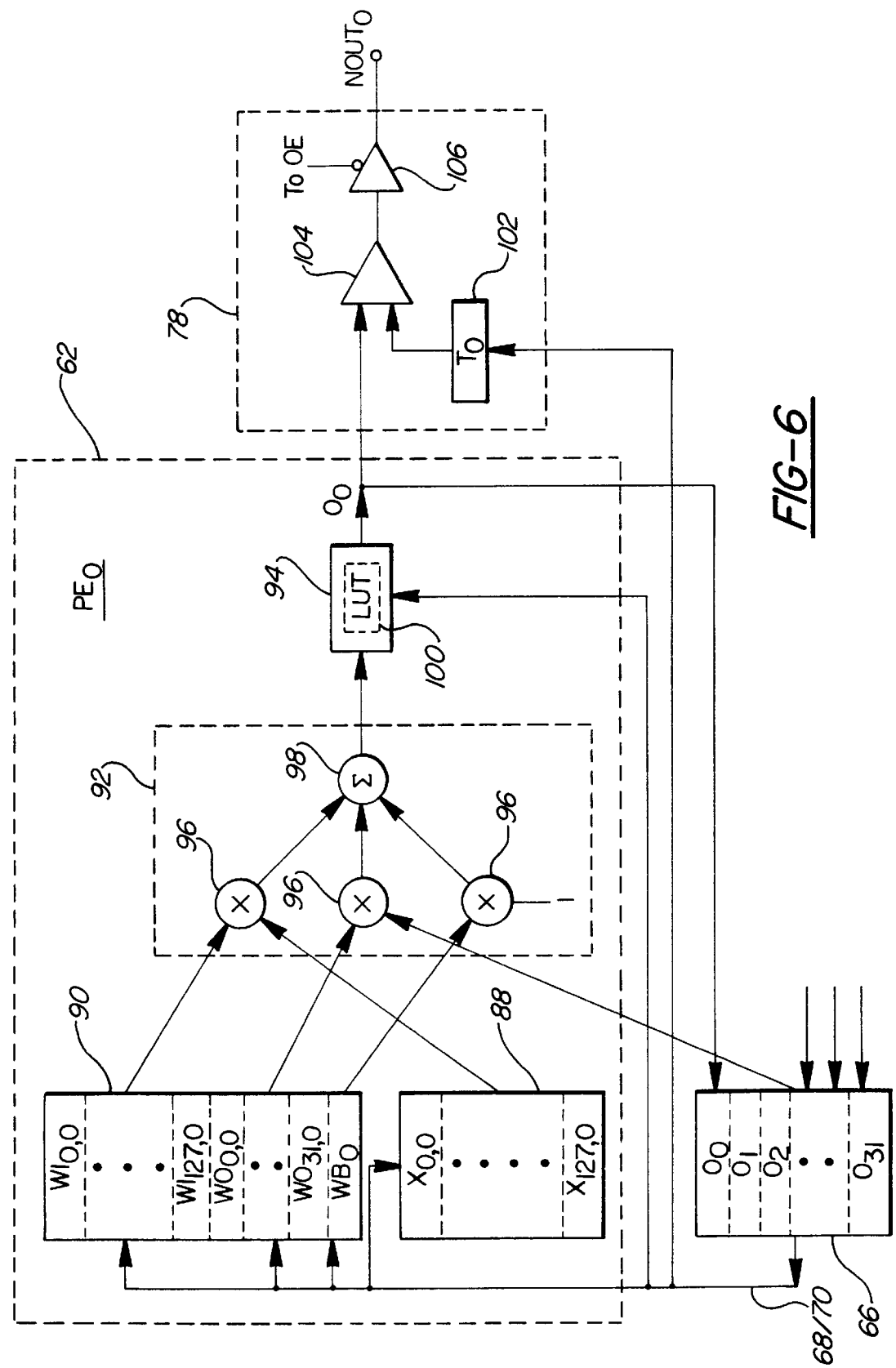
FIG. 6 is a schematic diagram of a PE, the output register and an output circuit shown in FIG. 4.

FIG. 6 is a schematic diagram of one of the PEs 62, output register 66, and one of the output circuits 78 shown in FIG. 4. For clarity, the internal address and data buses are shown as a single bus line 68/70. PE 62, identified as $PE_0$, includes an input array 88 with preferably 128 memory locations for storing input data $X_{i0}$, and a weight memory array 90 that stores weights $WI_{i0}$, $WO_{i0}$ and $WB_0$. In IC 31, weight memory array 90 is a portion of ROM 64. Each PE 62 preferably has its own input array 88. The PEs 62 can share a common input array but, as described below, the neural network's input layer is then limited to the number of memory locations set aside for storing input data, e.g., 128 inputs. The number of weights $WI_{i0}$ is equal to the number of inputs, the number of weights $WO_{i0}$ is equal to the number of PEs, and $WB_0$ is a single bias value for the PE 62.

The input array 88 is preferably a first-in first-out (FIFO) array which handles both vector and sequential data. With a FIFO array, the master processor 30 writes input data $X_{i0}$ to the same memory location and the FIFO array automatically shifts the data through its memory locations. When the master processor 30 writes data to the IC sequentially, i.e., one piece of data per computation cycle, the data in the FIFO is shifted so that the value in the last memory location is removed, and the new piece of data is written to the FIFO's first memory location. When the master processor 30 writes data in a vector format, 128 new pieces of data are read in and shifted to fill the FIFO array prior to each computation cycle.

PE 62 uses a dot product circuit 92 and an activation circuit 94 to implement the ICs' unique and characteristic PE equation:

$$O_j = \Theta\left[\left(\sum_{i=0}^{127} WI_{ij} \times X_{IJ}\right) + \left(\sum_{k=0}^{31} WO_{kj} \times O_k\right) + (WB_j)\right] \quad (1)$$

where $\Theta(.)$ is an activation function, typically sigmoidal. Once the input data is written into the FIFO array 88 and the start cycle command is issued, the dot product and activation circuits automatically compute the PE's output value $O_0$ without any further instruction from the master processor 30.

By designing the neural network IC to include both the memory array 90 that stores weights for both the input data and the PEs output values from the previous cycle, and the output register 66 that makes those output values immediately accessible to all of the PEs, each PE 62 can be positioned at any layer in the multilayer architecture and can be connected to any other PE 62. Taking all of the PEs together, they can be configured to implement an arbitrary feed-forward or recurrent architecture. By using the input array 88 to distribute the input data, the IC uses its available PEs more efficiently and expands the amount of input data it can process.

The dot product circuit 92 preferably includes three multiplication circuits 96 and a summing circuit 98. The multiplication circuits 96 compute the respective dot products of weights $WI_{i0}$ and inputs $X_{i0}$, weights $WO_{i0}$ and outputs $O_i$, and weights $WB_0$ and a constant, typically equal to one. Each dot product is computed by multiplying each value in the input array 88 or output register 66 by its corresponding weight in weight array 90 and summing the results. Summing circuit 98 sums the three dot products and applies the result $NET_0$ to the activation circuit 94.

The activation circuit 94 maps the output of the dot product circuit 92 through a preferably non-decreasing differentiable activation function $\Theta(.)$ into a known range, suitably 0 to 1, to generate the PE's output $O_0$. The activation function is suitably a sigmoidal function which is given by:

$$O_j = \frac{1}{1 + e^{-NET_j/\Theta_0}} \quad (2)$$

where $\Theta_0$ controls the shape of the sigmoid. The activation circuit is preferably implemented with a look-up table (LUT) 100 that is programmed with suitably three different sigmoid functions (different values of $\Theta_0$) or a pass function. The output $O_0$ is written into the output register 66 along with the outputs from the other thirty-one PEs, and is applied to output circuit 78.

Output circuit 78 includes a threshold register 102 that stores a threshold value $T_j$, which is preferably supplied by the master processor 30. A comparator 104 compares output $O_0$ to $T_j$, writes a high logic state into an output buffer 106 when the output exceeds the threshold value, and writes a low logic state into the buffer when the output is less than the threshold. When the master processor 30 toggles the output enable OE, the buffer 106 writes its logic state onto pin $NOUT_0$.

Figure 7:
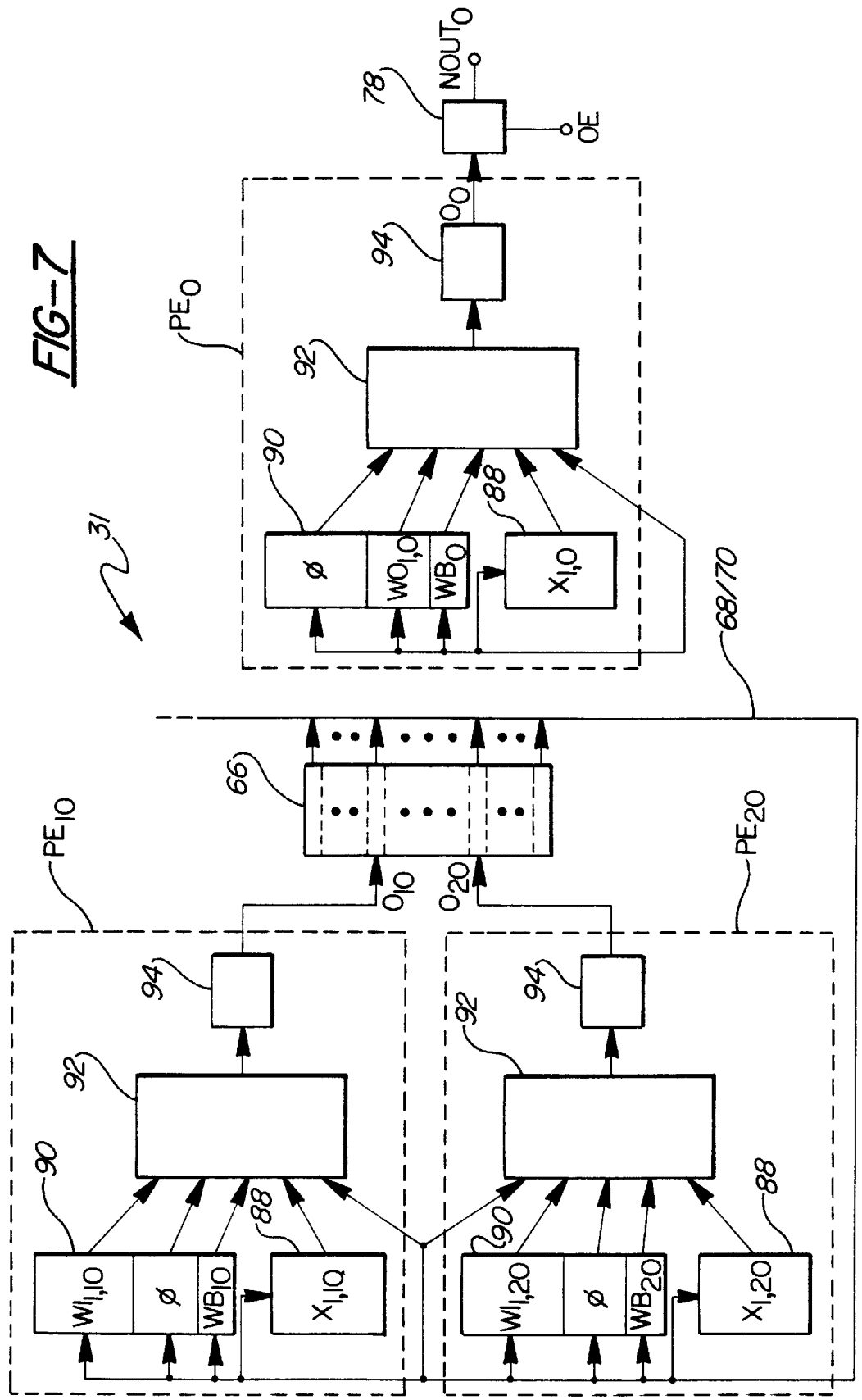
FIG. 7 is a schematic diagram of the neural network IC, illustrating how the PEs are configured into a multi-layer neural network.

FIG. 7 shows the IC 31 configured to provide a three layer feed-forward network with two PEs (suitably $PE_{10}$ and $PE_{20}$) in the hidden layer and a single PE, suitably $PE_0$, in the output layer. The FIFO arrays 88 perform the distribution function normally associated with a network's input layer, and hence are considered to be the input layer. The weights $WI_{ij}$, $WO_{ij}$ and $WB_j$ for the remaining twenty-nine PEs are set to zero. For purposes of discussion, the bias weights are ignored.

The PEs $PE_{10}$ and $PE_{20}$ in the hidden layer are loaded with their respective input weight values $WI_{i,10}$ and $WI_{i,20}$, and all of their output weight values $WO_{i,10}$, $WO_{i,20}$ are set to zero. $PE_0$ in the output layer is loaded with its output weight values $WO_{i,0}$ and its input weights $WI_{i,0}$ are set to zero. The PEs' input FIFO arrays 88 are loaded with the input data $X_{ij}$. Equation 1 is reduced to the following in $PE_{10}$ and $PE_{20}$:

$$O_j = \Theta\left(\sum_{i=0}^{127} WI_{i,j} \times X_{i,j}\right) \text{ for } j = 10, 20 \quad (3)$$

and is reduced to the following in $PE_0$:

$$O_0 = \Theta(WO_{10,0} \times O_{10} + WO_{20,0} \times O_{20}) \quad (4)$$

Two subcycles are required to compute the correct value for $O_0$. In the first subcycle, $PE_{10}$ and $PE_{20}$ generate outputs $O_{10}$ and $O_{20}$. Although $PE_0$ is computed during the first subcycle, its output is incorrect. At the second subcycle, the updated outputs $O_{10}$ and $O_{20}$ are available to $PE_0$, and hence it computes the correct output $O_0$. $PE_{10}$ and $PE_{20}$ recompute the same output values during the second subcycle. Output circuit 78 compares $O_0$ to the threshold, and when the OE pin is toggled at the end of the second subcycle, the output circuit sets the binary state at pin $NOUT_0$.

The neural network IC can also be configured to provide an expanded input capability. Input expansion requires each PE to have its own input array 88. For example, the network can be expanded to process 256 inputs by splitting the first hidden layer into two layers, and pairing up a PE ($PE_m$) in the first layer with a PE ($PE_n$) in the second layer. In this architecture, $PE_m$ is configured so that it produces a partial sum for half of the 256 inputs $X_{ij}$. $PE_m$'s input weight array is loaded with half of the input weights, and the output weights are set to zero. The all pass activation function is selected so that the value written into the $m^{th}$ location in the output register is:

$$O_m = \sum_{i=0}^{127} WI_{i,m} \times X_{i,m} \quad (5)$$

$PE_n$ is configured so that its input weights are set to the second half of the input weights. The output weight corresponding to $PE_m$ is set to 1, and all other values are set to zero. The second half of the input data is written into its FIFO array. Substituting these values into equation 1 and using equation 5 gives:

$$O_n = \Theta\left(\sum_{i=0}^{255} WI_{i,n} \times X_{i,n}\right) \quad (6)$$

Input expansion does require additional PEs and computation subycles, but increases the flexibility of the neural network IC.

The values for weights $WI_{ij}$, $WO_{ij}$ and $WB_j$ are preferably computed off line, and either programmed into ROM on the IC or into the master processor 30. However, the neural network IC 31 can support on line training by replacing the ROM with a RAM so that its weight values can be changed. To train the network on line, the master processor 30 is programmed with a training algorithm, such as the back-propagation algorithm. In general, the master processor 30 writes initial weight values to the IC 31 which in turn computes the neural network. The master processor 30 then reads the output values from the output register, compares them to known output values for the test input data, adjusts the weight values, and writes them to the IC 31. This continues until the values of the weights converge so that the neural network reliably generates the correct output values for the test input data. Thereafter, the weight values are stored on the chip or master processor 30, and the chip is used as described previously to compute the neural network as trained.

While several illustrative embodiments of the invention have been shown and described, numerous variations and alternate embodiment will occur to those skilled in the art. Such variations and alternate embodiments are contemplated, and can be made without departing from the spirit and scope of the invention as defined in the appended claims.

We claim:

1. A neural network integrated circuit (IC) having a programmable architecture, comprising:

a plurality of processing elements (PEs) that generate output values at successive computation cycles, each PE comprising:

a data memory, an input weight memory, an output weight memory, a processing circuit that computes an intermediate value that is a function of the contents of said data and input weight memories, the contents of the output weight memory and the PEs' output values from a previous cycle, and an activation circuit that maps the intermediate value into said output value in accordance with a desired activation function;

an output memory for storing said output values so that said stored output values are accessible to each PE's processing circuit at the next computation cycle;

a data bus for writing input into the data memory;

a timing circuit that is enabled when data is written into said data memories, counts a fixed amount of time per subcycle, and outputs an interrupt when p+1 subcycles have been completed; and an output circuit that reads out L of said PEs' output values in response to said interrupt, the input and output weight memories being programmed with arrays of respective input and output weights configuring the PEs to include and compute in p+1 computation subcycles p hidden layers that extract features from the input data, and an output layer that weights the respective features.

2. The neural network of claim 1, wherein said output circuit includes L logic circuits that compare the output values from L of said PEs in the output layer to respective threshold values to provide binary outputs.

3. A neural network integrated circuit (IC) having a programmable architecture, comprising:

a plurality of processing elements (PEs), including a plurality of PEs arranged in n layers, that generate output values at successive computation cycles, said computation cycles having n subcycles, one for each layer, each PE comprising:

a data memory, an input weight memory, an output weight memory, a processing circuit that computes an intermediate value that is a function of the contents of said data and input weight memories, the contents of the output weight memory and the PE's output values from a previous cycle, and an activation circuit that maps the intermediate value into said output value in accordance with a desired activation function;

an output memory for storing said output values so that said stored output values are accessible to each PE's processing circuit at the next computation cycle; and a PE selection circuit that stores an execution subcycle for each PE and controls said output memory so that the PE's output values are only written into said output memory during their respective execution subcycles, the input and output weight memories being programmable so that the PEs can be interconnected to provide a desired neural network architecture.

4. The neural network of claim 3, further comprising a timing circuit that is enabled at the beginning of each computation cycle and increments a count at the end of each subcycle, said PE selection circuit comprising:

a memory for storing the execution subcycles;

a temporary buffer for storing the PEs' output values at each subcycle; and a comparator that compares each of said execution subcycles to said count, and enables said temporary buffer to write the respective output values to the output memory when said execution subcycle equals said count.

5. A neural network processor, comprising:

a neural network integrated circuit that includes a plurality of processing elements (PEs), including a plurality of PEs arranged in n layers, which generate output values at successive computation cycles, said computation cycle having n subcycles, one for each layer, and an output memory that stores the output values so that they are accessible to the PE's at the next computation cycle, each PE comprising:

a data memory for storing the input data values, an input weight memory for storing input weights, an output weight memory for storing output weights, said input and output weights configuring the PEs to provide a desired neural network architecture, and a processing circuit that computes said output value as a function of the input data values and input weights, and the output weights and PEs' output values from a previous cycle;

a microprocessor that writes input data into the PEs' data memories, and controls a start cycle to initiate the computation of said output values, and an output enable to read the output values;

a timing circuit that receives a clock signal, initiates computation of the PEs in response to said start cycle, counts a fixed number of clock cycles per subcycle, increments a count at the end of each subcycle and generates an interrupt at the end of said computation cycle; and a PE selection circuit that stores an execution subcycle for each PE and controls said output memory so that the PE's output values are only written into said output memory when their respective execution subcycles are the same as the said count.

* * * * *